United States Patent
Winter

(10) Patent No.: US 8,109,131 B2
(45) Date of Patent: *Feb. 7, 2012

(54) METER REGISTER TRANSMITTING FLOW RATE WARNING

(75) Inventor: Dan Winter, Pardessia (IL)

(73) Assignee: Arad Measuring Technologies Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 12/013,853

(22) Filed: Jan. 14, 2008

(65) Prior Publication Data

US 2008/0209985 A1  Sep. 4, 2008

Related U.S. Application Data

(60) Continuation of application No. 11/104,097, filed on Apr. 12, 2005, now abandoned, which is a division of application No. 10/092,020, filed on Mar. 6, 2002, now Pat. No. 6,819,292.

(60) Provisional application No. 60/274,812, filed on Mar. 9, 2001.

(51) Int. Cl.
*G01M 3/08* (2006.01)
*G01M 3/28* (2006.01)

(52) U.S. Cl. .................. 73/40.5 R; 73/49.1; 73/861.94

(58) Field of Classification Search ............... 73/861.88, 73/861.94, 40.5 R, 49.1
See application file for complete search history.

(56) References Cited

U.S. PATENT DOCUMENTS

| | | | |
|---|---|---|---|
| 2,996,713 A | 8/1961 | Boyer | |
| 3,169,398 A | 2/1965 | Sparling et al. | |
| 3,388,388 A | 6/1968 | Brown | |
| 3,388,595 A * | 6/1968 | Last et al. | 73/861.94 |
| 3,505,513 A * | 4/1970 | Fowler et al. | 73/40 |
| 3,667,495 A | 6/1972 | Schuler et al. | |
| 3,676,875 A | 7/1972 | Adams et al. | |
| 3,685,353 A | 8/1972 | Gestler et al. | |
| 3,729,727 A | 4/1973 | Young et al. | |
| 3,798,634 A | 3/1974 | Kamada | |
| 3,813,597 A | 5/1974 | Le Vitt | |
| 3,846,789 A | 11/1974 | Germer et al. | |
| 3,858,448 A | 1/1975 | Evans et al. | |
| 3,949,606 A | 4/1976 | Blancett | |

(Continued)

FOREIGN PATENT DOCUMENTS

DE       19725247       12/1998

(Continued)

OTHER PUBLICATIONS

Nobuhiro Kuga et al., "Circular Patch Antennas Miniaturized by Shorting Posts", Electronics and Communications in Japan, 1996, pp. 51-58, vol. 79, No. 6, 1996 Scripta Technica, Inc., Part 1.

*Primary Examiner* — Lisa Caputo
*Assistant Examiner* — Punam Roy
(74) *Attorney, Agent, or Firm* — The Webb Law Firm

(57) ABSTRACT

A method and apparatus for measuring a fluid and determining a leak comprising the steps of providing a meter and a meter register coacting with the meter. When a leak is detected, a signal is transmitted from the meter register regarding fluid consumption. The transmitted signal indicates a leak either when the measured flow rate remains a fixed volume over a fixed period of time, or the measured flow rate exceeds a threshold value.

13 Claims, 6 Drawing Sheets

U.S. PATENT DOCUMENTS

| | | | |
|---|---|---|---|
| 4,022,977 A | 5/1977 | Nomura | |
| 4,023,410 A | 5/1977 | Althaus | |
| 4,032,805 A | 6/1977 | Hereford | |
| 4,090,220 A | 5/1978 | Gargini | |
| 4,123,758 A | 10/1978 | Shibano et al. | |
| 4,134,026 A | 1/1979 | Sone et al. | |
| 4,589,435 A * | 5/1986 | Aldrich | 137/102 |
| 4,616,700 A * | 10/1986 | Wood et al. | 166/250.08 |
| 4,683,472 A | 7/1987 | Beling | |
| 4,776,206 A * | 10/1988 | Armstrong et al. | 73/40 |
| 4,841,782 A | 6/1989 | Buchanan | |
| 4,911,010 A | 3/1990 | Foran, Jr. et al. | |
| 4,996,888 A | 3/1991 | Foran, Jr. et al. | |
| 5,111,407 A | 5/1992 | Galpern | |
| 5,143,257 A | 9/1992 | Austin et al. | |
| 5,197,337 A | 3/1993 | Glasheen | |
| 5,199,307 A | 4/1993 | Onoda et al. | |
| 5,228,329 A * | 7/1993 | Dennison | 73/49.1 |
| 5,259,251 A | 11/1993 | Brinster et al. | |
| 5,298,894 A | 3/1994 | Cerny et al. | |
| 5,315,862 A * | 5/1994 | Hasselmann | 73/40.5 R |
| 5,325,715 A | 7/1994 | Foran, Jr. et al. | |
| 5,455,781 A * | 10/1995 | Reynal et al. | 73/196 |
| 5,493,917 A | 2/1996 | Clanin | |
| 5,519,387 A | 5/1996 | Besier et al. | |
| 5,540,107 A | 7/1996 | Silverman et al. | |
| 5,621,419 A | 4/1997 | Meek et al. | |
| 5,659,300 A | 8/1997 | Dresselhuys et al. | |
| 5,659,303 A | 8/1997 | Adair, Jr. | |
| 5,673,053 A | 9/1997 | Marthinsson | |
| 5,691,484 A | 11/1997 | Feller | |
| 5,748,104 A | 5/1998 | Argyroudis et al. | |
| 5,789,672 A | 8/1998 | Rogers et al. | |
| 5,825,303 A | 10/1998 | Bloss, Jr. et al. | |
| 5,877,703 A | 3/1999 | Bloss, Jr. et al. | |
| 5,959,550 A | 9/1999 | Giles | |
| 5,965,826 A | 10/1999 | Von Bertrab | |
| 5,966,010 A | 10/1999 | Loy et al. | |
| 5,986,574 A | 11/1999 | Colton | |
| 6,079,263 A | 6/2000 | Beddies | |
| 6,085,599 A | 7/2000 | Feller | |
| 6,098,456 A | 8/2000 | Munck | |
| 6,115,677 A | 9/2000 | Perthold et al. | |
| 6,177,883 B1 | 1/2001 | Jennetti et al. | |
| 6,181,294 B1 | 1/2001 | Porter et al. | |
| 6,246,677 B1 * | 6/2001 | Nap et al. | 370/346 |
| 6,333,626 B1 | 12/2001 | Edwards | |
| 6,346,914 B1 | 2/2002 | Annamaa | |
| 6,502,468 B1 | 1/2003 | Thornborough | |
| 6,604,434 B1 | 8/2003 | Hamilton et al. | |
| 6,611,769 B2 | 8/2003 | Olson | |
| 6,612,188 B2 | 9/2003 | Hamilton | |
| 6,681,645 B1 | 1/2004 | Feller | |
| 7,119,698 B2 | 10/2006 | Schleich et al. | |
| 7,126,551 B2 * | 10/2006 | Winter | 343/719 |
| 2002/0083778 A1 | 7/2002 | Hamilton | |
| 2003/0150280 A1 | 8/2003 | Meistermann | |

FOREIGN PATENT DOCUMENTS

| | | | |
|---|---|---|---|
| EP | 0278070 | | 8/1988 |
| EP | 0629098 | | 12/1994 |
| EP | 1079207 | | 2/2001 |
| FR | 1331112 | | 6/1963 |
| GB | 2101782 | | 1/1983 |
| GB | 2123556 | | 2/1984 |
| GB | 2326002 | | 12/1998 |
| WO | WO 9810394 | * | 3/1998 |
| WO | 9949680 | | 9/1999 |

* cited by examiner

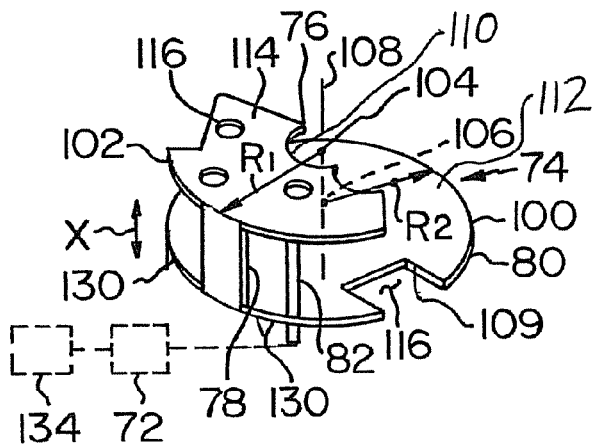
FIG. 6
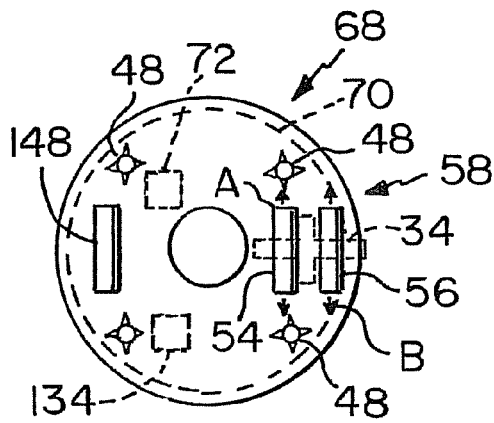
FIG. 7
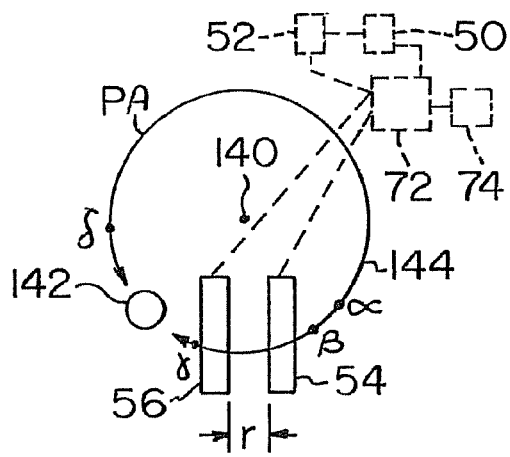
FIG. 8
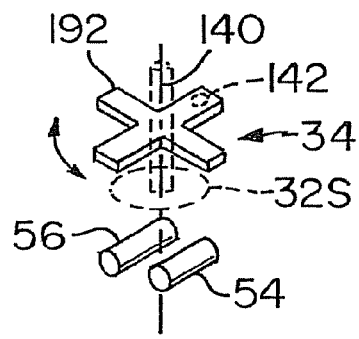
FIG. 9
| CLOCKWISE | | | C. CLOCKWISE | | |
|---|---|---|---|---|---|
| SECTION | REED 54 | REED 56 | SECTION | REED 54 | REED 56 |
| δ α | 0 | 0 | δ α | 0 | 0 |
| α β | 1 | 0 | γ δ | 0 | 1 |
| β γ | 1 | 1 | β γ | 1 | 1 |
| γ δ | 0 | 1 | α β | 1 | 0 |
FIG. 10

METER REGISTER TRANSMITTING FLOW RATE WARNING

CROSS REFERENCE TO RELATED APPLICATIONS

The present invention is a continuation of U.S. patent application Ser. No. 11/104,097 filed Apr. 12, 2005, now abandoned which is a divisional of U.S. patent application Ser. No. 10/092,020, filed Mar. 6, 2002, now U.S. Pat. No. 6,819,292 which claims the benefit of U.S. Provisional Application No. 60/274,812 filed Mar. 9, 2001 entitled "Meter Register" which is hereby incorporated by reference in its entirety.

BACKGROUND OF THE INVENTION

1. Field of the Invention

The present invention relates to meter registers and, more particularly, to meter registers for remote reading.

2. Description of Related Art

Presently, many locales visually read utility meters to determine utility consumption. The meters, such as water meters, include an odometer that identifies the consumption of the water consumed. The odometer is read periodically and the difference between the present and the prior reading determines the amount of utility water used. For example, if the most recent water meter reading was 2 million gallons or liters and the previous water meter reading was 1.8 million gallons or liters, then 200,000 gallons or liters of water were consumed. This procedure of individually reading water meters is time consuming, labor intensive, and expensive. In a competitive market, such an expense affects profitability to the utility provider. This is especially a problem in submetering markets where a separate entity may have to be employed to read water meters in apartment buildings and apartment building complexes.

Subsequently, systems were developed relating to remote reading systems. One such system is described in U.S. Pat. No. 5,111,407 to Galpern and entitled "System for Measuring and Recording a Utility Consumption". This particular arrangement incorporated a transponder and receiver arrangement whereby a meter reader placed a meter reading device in close proximity to a transponder for a meter reading. This arrangement reduced the time spent by the meter reader on an individual site and more accurately recorded utility consumption. However, meter reading was still a labor intensive process.

Subsequently, meter reading systems have evolved whereby they are either connected to telephone lines and/or transmitters which transmit radio waves to a central location. In many instances, this eliminates many of the problems associated with utility consumption reading.

However, a problem has always existed with utility meters in that the register required substantial modification to retrofit the meter to attach a transponder. One solution was to make a hole in the register glass to attach a wire or antenna. Other solutions included drilling holes in the register case to accomplish the same goal. Problems occur when one attempts to drill through the register case, namely, moisture buildup in the register case. The moisture buildup can corrode metallic parts and/or cause short circuiting of the electrical components.

Therefore, it is an object of the present invention to overcome the deficiencies of the prior art.

SUMMARY OF THE INVENTION

The present invention is an antenna for transmitting a radio frequency signal that includes a first electrically conductive sheet, a second electrically conductive sheet spaced a first distance apart from the first electrically conductive sheet, and an axially extending leg electrically connected to the first electrically conductive sheet and the second electrically conductive sheet. The axially extending leg is electrically conductive. Preferably, the antenna is made of metal and made of a unitary sheet of metal.

The present antenna can be incorporated in a meter register that includes a register body. A rotatable drive shaft is coupled to the register body and a drive gear is attached to the drive shaft. At least one follower gear is rotatably attached to the register body and coupled with the drive gear.

Further, the present invention is a utility meter that includes a meter body having a chamber through which material passes. A measuring unit is contained within the chamber. The chamber includes a rotating member having a magnetic member and a sealed register attached to the chamber. The sealed register includes a corresponding magnetic member attached to the drive shaft coacting with the magnetic member and the above-described antenna.

The present invention is also an antenna adapter that includes a circular metallic ring, a first electrically conductive sheet, and a second electrically conductive sheet axially spaced from the first electrically conductive sheet. A cable electrically connects the metallic ring to the first electrically conductive sheet and the second electrically conductive sheet whereby the metallic ring is adapted to be secured to an exterior portion of the meter register.

The present invention is also a method for measuring a utility that includes steps of providing a meter, providing meter register, transmitting a signal from the meter register, the signal identifying the meter type identification code and utility consumption, and receiving the information by a central authority.

The present invention is also directed to a method and apparatus to detect fluid flow movement through a meter via the meter register that includes a magnet rotatably coupled to a register drive shaft and magnetically coacting with magnetically activated switches. The position of the magnet relative to the magnetically activated switches determines position of the magnet. Over a period of time, the direction of movement of the magnet can be determined, which in turn is correlated to the direction of the movement of the drive shaft and material flowing through the meter register.

BRIEF DESCRIPTION OF THE DRAWINGS

FIG. 6 is a top perspective view of an antenna used with the register shown in FIGS. 3 and 4;

FIG. 7 is a bottom plan view of the antenna and a portion of the antenna shown in FIG. 6;

FIG. 8 is a schematic view of a flow directional indicator used in conjunction with the register shown in FIGS. 3 and 4;

FIG. 9 is a top perspective flow indicator depicted in FIG. 8;

FIG. 10 is a chart identifying flow direction used in conjunction with the flow indicator shown in FIG. 8;

DESCRIPTION OF THE PREFERRED EMBODIMENT

Figure 1:
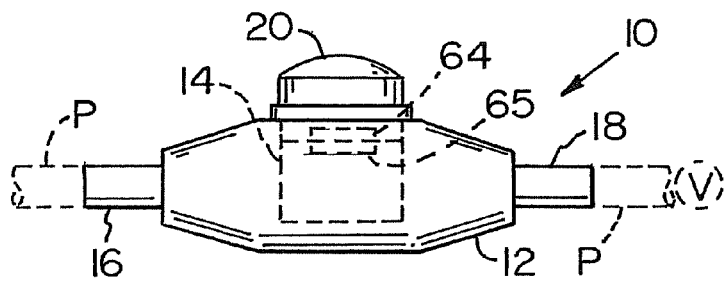
FIG. 1 is a side elevational view of a meter including a meter register made in accordance with the present invention.
Figure 2:
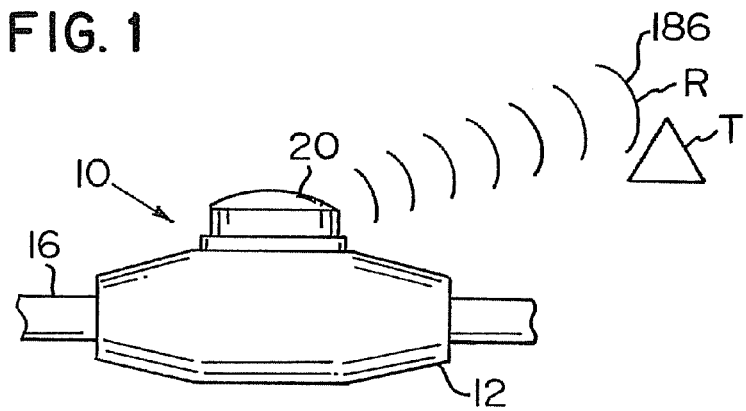
FIG. 2 is a side elevational view of the meter shown in FIG. 1 transmitting a signal to a receiver.
Figure 21:
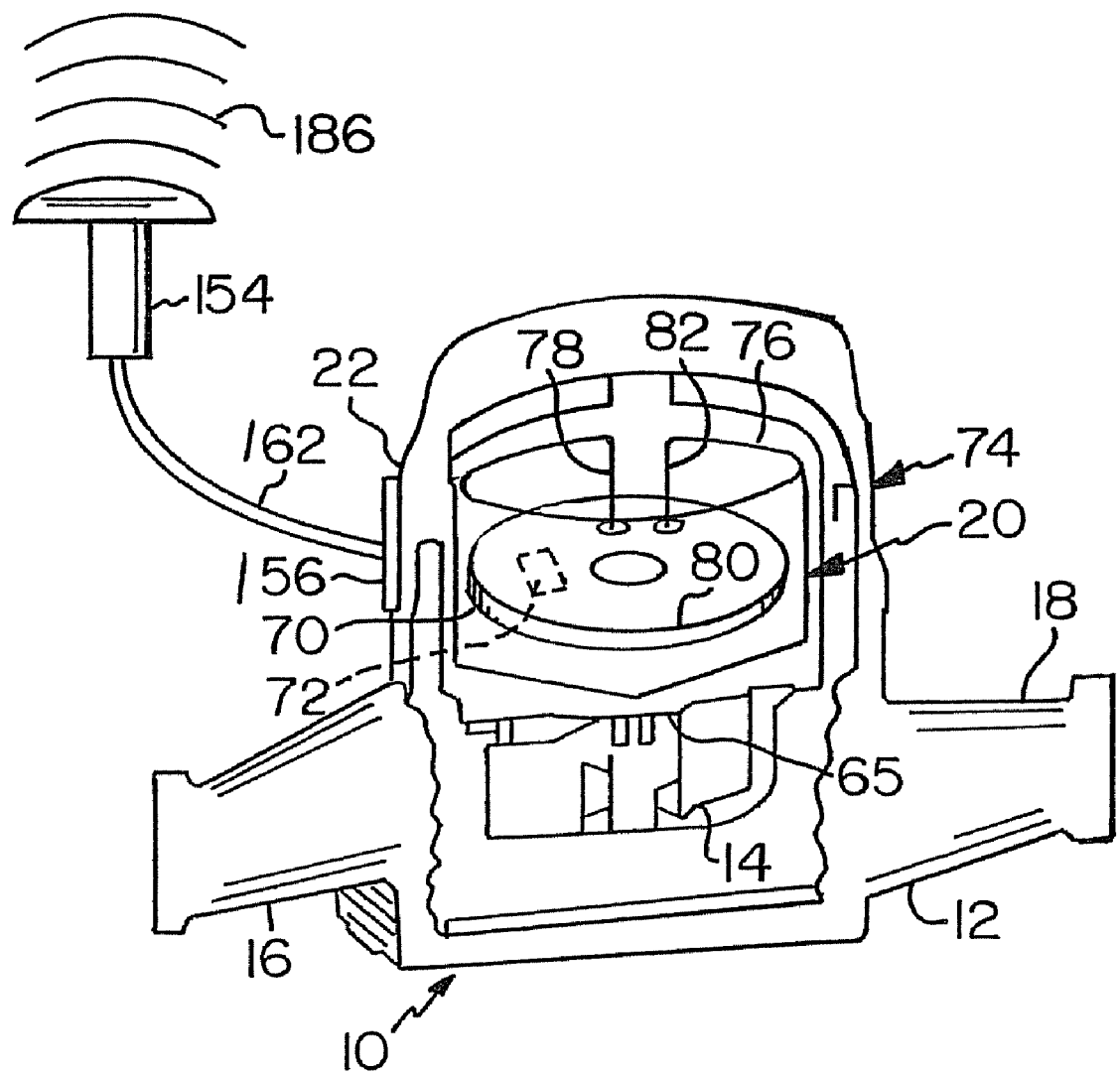
FIG. 21 is a schematic representation of the meter and auxiliary antenna made in accordance with the present invention.

FIGS. 1 and 21 show a water meter 10 made in accordance with the present invention. The water meter 10 includes a body 12 having a measuring chamber 14, an inlet 16, an outlet 18, and a register 20. Preferably, the body 12 is made of a metallic material, such as bronze, copper, plastic, or stainless steel, although it can be made of other materials. The measuring chamber 14 can include many different types of measuring-type chambers, such as positive displacement chambers and/or a vane or a multi-jet type chamber. The inlet 16 and outlet 18 are adapted to be secured to piping P. The register 20 is a sealed register and preferably is magnetically coupled to the measuring chamber 14, which includes a magnetic drive arrangement that is well known in the art. The register 20 of the water meter 10 of the present invention includes an arrangement to transmit and receive radio waves R as depicted in FIG. 2. The radio waves R are received by a transmission/receiving arrangement, such as a tower T, as shown in FIG. 2.

FIGS. 3, 4, 18, 19, and 20 show the register 20 made in accordance with the present invention. The register 20 includes a face cap 22 attached to a metallic cup 24. Preferably, the face cap 22 is made of glass or a clear polymeric material and is fixably secured to the metallic cup 24 which can be made of copper or stainless steel. The metallic cup 24 can be received by a polymeric shroud 27. The face cap 22 is mechanically sealed to the metallic cup 24 and includes a rubber gasket or seal 25 to secure the face cap 22 and metallic cup 24 together and be held via a friction fit. An internal cavity C is defined by the face cap 22 and the metallic cup or bottom portion 24.

Figure 4:
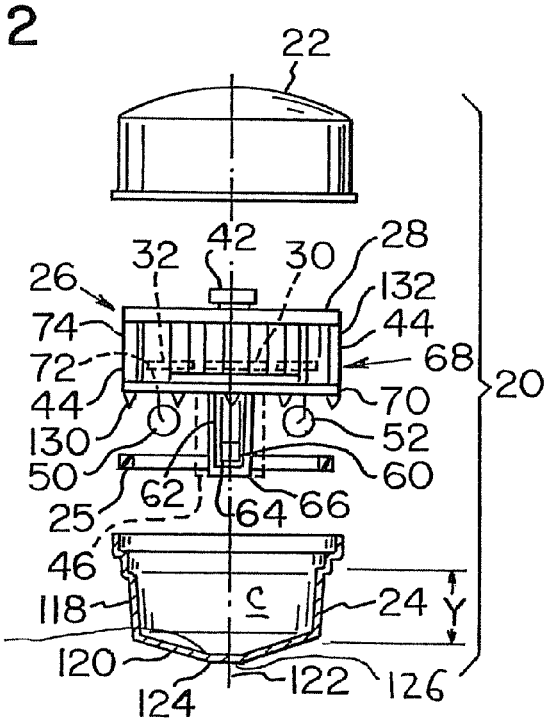
FIG. 4 is an exploded side elevational view, partially in section, of the register shown in FIG. 3.
Figure 5:
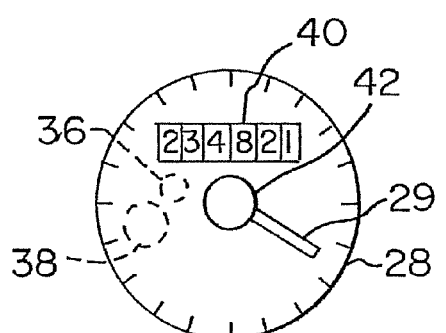
FIG. 5 is a top perspective view of a face plate and odometer of the register shown in FIGS. 3 and 4.

Referring to FIGS. 4, 5, 18, 19, and 20, the register 20 includes a register subassembly 26. The register subassembly 26 includes a face plate 28, a dial 29, and a gear train drive 30. The gear train drive 30 includes a plurality of gears 32 coacting with each other as shown in FIG. 4. Typically, the gears 32 are tooth gears that are meshed with one another. One of the gears 32s includes a magnet arrangement 34, as shown in FIG. 9. The magnet arrangement 34 takes the shape of a cruciform having four legs extending from a center, although any shape could be provided. The gear train drive 30 is coupled to a gear drive 36 positioned on the face plate 28 as shown in FIG. 5. The gear drive 36 includes meshed gears 38 which drive both an odometer 40 and a wheel dial 42, as well as a dial 29. A plurality of spacer shafts 44 is provided for spacing various boards of the register 20. A magnetic shield 46 shown in phantom in FIG. 4 is provided for anti-magnet protection. Clips 48 are provided to connect meter components together including a circuit board 70 shown in phantom in FIG. 7. Batteries 50 and 52 are electrically coupled to the circuit board 70.

A magnetic direction detection arrangement 58 is provided on a lower portion of the subassembly 26 and includes reed switches 54 and 56. The reed switches 54 and 56 are magnetically activated switches. The reed switches 54 and 56 extend along axes A and B. Axes A and B are parallel to each other. Further, the reed switches 54 and 56 are radially spaced apart from each other as depicted by r in FIG. 7. The magnetic arrangement 34 as shown in FIG. 9 is in close proximity to the reed switches 54 and 56.

Referring back to FIG. 4, a magnetic drive arrangement 60 is provided and includes a shaft or extended shaft 62 and a magnetic coupling 64 which is adapted to coact with a magnetic drive 65 of the meter measuring chamber 14. A magnetic shield 66 or anti-magnetic housing is provided for protecting the electronics from magnetic fields. More specifically, the magnetic drive arrangement 60 includes the magnetic coupling 64 attached to and contained within the drive shaft 62. Rotation of the drive shaft 62 provides the mechanical energy, i.e., force and torque, to drive the gear train drive 30, in that the drive shaft 62 is mechanically coupled to the gear drive train 30.

An electronics package 68 is provided within the register 20. The electronic package 68 includes the board 70 that has a microprocessor 72 which is electrically coupled to the batteries 50 and 52.

The register 20 includes an antenna 74 is electronically coupled to the microprocessor 72. As shown in FIG. 6, the antenna 74 includes an arc-shaped section 76 having a leg 78 depending therefrom and a bottom substantially circular section 80. Coaxial cable 82 is electrically coupled to the arc-shaped section 76 and the circular section 80 and electrically coupled to the microprocessor 72 as shown in phantom. This type of antenna is known as a PIFA antenna. The arc-shaped section 76 is the radiating plane and the circular section 80 is the ground plane. The leg 78 causes a short circuit between the radiating plane and the ground plane. The inner conductor of the coaxial cable 82 is electrically connected to the radiating plane and the outer conductor of the coaxial cable is connected to the ground plane.

More specifically, the antenna 74 includes a first electrically conductive sheet 80, a second electrically coupled conductive sheet 76 spaced a first distance apart X from the first metallic sheet 80, and an axially extending leg 78 electrically connected to the first electrically conductive sheet 80 and the second electrically conductive sheet 76. The axially extending leg 78 is likewise electrically conductive. Preferably, the first electrically conductive sheet 80, the second electrically conductive sheet 76, and the axially extending leg 78 are made of metal. More preferably, the first electrically conductive sheet 80, the second electrically conductive sheet 76 and the axially extending member 78 are made from a unitary sheet of metal. The first electrically conductive sheet 80 has a first arcuate-shaped outer edge 100 and the second electrically conductive sheet 76 has a second arcuate outer edge 102 wherein the axially extending member 78 extends from the first arcuate-shaped outer edge 100 to the second arcuate-shaped outer edge 102. The first arcuate-shaped outer edge 100 has a first radius $R_1$ extending from a first center point 104 and a second arcuate-shaped outer edge 102 has a second radius $R_2$ extending from a second center point 106. The first center point 104 and the second center point 106 are contained on a center line 108. The first electrically conductive sheet 80 and the second electrically conductive sheet 76 are contained in a first plane 109 and a second plane 110, respectively. The first electrically conductive sheet 80 has a first surface area 112 and a second electrically conductive sheet 76 has a second surface area 114, wherein the first surface area 112 is greater than the second surface area 114. Both the first electrically conductive sheet 80 and the second electrically conductive sheet 76 include cut-out sections 116. The cut-out sections 116 permit the antenna 74 to be accommodated by the meter register 20 by permitting other register components to be received by the cut-out sections 116. For example, the reed switches 54 and 56 are contained within one of the cut-out sections 116. As stated previously, the coaxial cable 82 is electrically coupled to the first electrically conductive sheet 80 and the second electrically conductive sheet 76. Preferably, the distance X is approximately equal to or a multiple of a wavelength distance to be transmitted from the antenna 74. Essentially, the axially extending leg 78 has a length equal to X. Although the antenna 74 shows substantially arcuate and circular sheets, the sheets can also be other shapes, such as rectangular or square, for example.

The metallic cup 24 is electrically coupled to the first electrically conductive sheet 80 and the second electrically conductive sheet 76. The cup 24 is an opened top structure having a cylindrically-shaped side wall 118 attached to a bottom wall 120. The bottom wall 120 slopes away from the opened top portion toward a central axis 122 passing through the cup 24. Preferably, a portion 124 of the bottom wall 120 is frusta-conical in shape. The bottom wall 120 includes a flat central portion 126 connected to an end 128 of the frusta-conical portion 124 that is adapted to receive the magnetic coupling 64. Preferably, the first electrically conductive sheet 80 includes tabs 130 extending therefrom used for contacting the metallic cup 24.

The first electrically conductive sheet 80 is spaced a second distance Y from the bottom wall 120, which is approximately equal to or a multiple of a wavelength to be transmitted by the antenna 74. A portion of the subassembly 26, which includes a mechanical portion 132 of the register 20, that includes the gear train drive 30 is received between the first conductive sheet 80 and the second conductive sheet 76. The electronic package 68 includes an electrical frequency generator 134 coupled to the first conductive sheet 80 via the coaxial cable 82.

The antenna 74 is coupled to the power source, i.e., the batteries 50 and 52, via the frequency generator 134. More specifically, the board 70 includes the frequency generator 134 which is electrically coupled to the first electrically coupled sheet 80.

Figure 3:
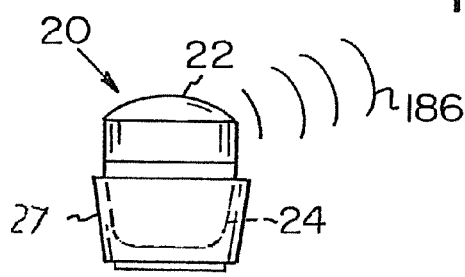
FIG. 3 is a side elevational view of a register made in accordance with the present invention.
Figure 11:
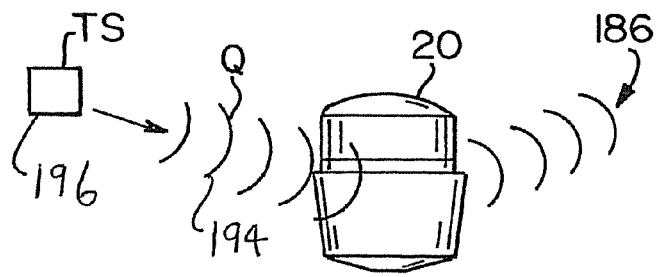
FIG. 11 is an elevational view of the register shown in FIGS. 3 and 4 receiving and emitting signals.

This present arrangement results in a very compact sealed register 20 which has an internal antenna. The metallic cup 24 also acts as an amplifier for the antenna 74 and forms an antenna structure. The metallic cup 24 also amplifies the radio waves that are emitted from the antenna 74 so that they may be directed externally of the register 20 as shown in FIGS. 2, 3, and 11. Furthermore, it has been found that electrically coupling the register 20 to a metallic meter case, such as the body 12, further amplifies the signal.

Referring back to the meter register 20, the mechanical portion of the meter register includes a register body 136 having the rotatable shaft or drive shaft 62 coupled thereto. A drive gear 138 is attached to the drive shaft 62 and at least one follower gear 32 is rotatably attached to the register body 136 coupled to the drive gear 138. The antenna 74 is attached to the register body 136, which is sandwiched between the first electrically conductive sheet 80 and the second electrically conductive sheet 76. The odometer 40 is coupled to the drive gear 138 and at least one follower gear 32. The rotatable drive shaft 62 includes a magnetic member or coupling 64 attached to a first end and the indicator 29 which attaches to a second end. The register drive shaft 62 extends along the longitudinal axis 122 and the first electrically conductive sheet 80 is contained in the first plane 109 and the second electrically conductive sheet 76 is contained in a second plane 110, the longitudinal axis 122 being normal to the first plane 109 and the second plane 110.

Referring to FIG. 9, a sensing follower gear 32s is rotatably secured to the body 136 and coacts with the drive gear 138 via a gear train drive 30 or through direct coupling. The sensing follower gear 32s rotates about a sensing axis 140 and drives the magnet arrangement 34. The magnet arrangement 34 includes at least one sensing magnet 142 that coacts with the sensing follower gear 32s and is radially spaced from the sensing axis 140. When the sensing follower gear 32s rotates about the sensing axis 140, the sensing magnet 142 rotates about the sensing axis 140 in a rotating magnetic plane 144. The reed switches 54 and 56 are radially spaced. When the sensing magnet 142 and the reed switches 54 and 56 are radially aligned, the reed switches 54 and 56 are in a first state, and when the sensing magnet 142 is not radially aligned with the reed switches 54 and 56, the reed switches 54 and 56 are in a second state. Also, only one of the reed switches 54 and 56 will be in a first or second state depending on the position of the sensing magnet 142 relative to the reed switches 54 and 56.

A rotational direction of the sensing follower gear 32s can therefore be determined by monitoring the sequence of the first state and second state of the reed switches 54 and 56 as shown in FIG. 10. The reed switches 54 and 56 are electrically coupled to the microprocessor 72 which can determine the rotational direction of the magnet arrangement 34, which in turn can determine the rotational direction of the measuring chamber 14. In this manner, one can determine if a reverse flow or forward flow condition is occurring through the meter 10 as shown in FIG. 10, since one can determine the direction of rotation of the drive shaft 62. More particularly, as can be seen in FIGS. 8-10, the magnet 142 rotates about the sensing axis 140. Each reed switch 54 and 56 is activated depending on the proximity of the magnet 142 to the reed switches 54 and 56. The magnet 142 rotates about a circular path PA. The path PA can be divided into four segments: $\alpha\beta$, $\beta\gamma$, $\gamma\delta$, and $\delta\alpha$ when the magnet 142 is in the segment $\alpha\beta$, the reed switch 54 is in the first state or activated state designated as one (1) in FIG. 10, and the reed switch 56 is in a second state or deactivated state and designated as zero (0) in FIG. 10. When the magnet 142 is in the segment by, the reed switches 54 and 56 are in the first state or activated state and designated as one's (1) in FIG. 10. When the magnet 142 is in the segment $\gamma\delta$, the reed switch 54 is in the second state or deactivated state designated as zero (0) in FIG. 10 and the reed switch 56 is in the first state or activated state designated as one (1) in FIG. 10. Finally, if the magnet 142 is in the segment $\delta\alpha$, both reed switches 54 and 56 are in the deactivated state or second state designated as zero's (0) in FIG. 10. Depending on the sequence of the magnet position and the state of the reed switches 54 and 56, the direction of rotation can be determined.

Also, a magnetically activated switch or reed switch 148 can be provided with the register 20 and coupled to the microprocessor 72. The reed switch 148 is electrically coupled to the microprocessor 72 wherein when a magnetic field activates the magnetically activated switch 148 for a fixed period of time, the register 20 and/or antenna 74 emits a signal that indicates the register has been tampered with.

Preferably, the face cap 22 and metallic cup 24 form the internal seal chamber C via an elastomeric sealing member wherein the sealed chamber receives the register body 12. Preferably, the internal chamber C is at a pressure below atmospheric pressure and, more preferably, at a pressure minus 9 atmospheres. Hence, the microprocessor 72 and antenna 74 are maintained in the evacuated internal chamber C.

Figure 14:
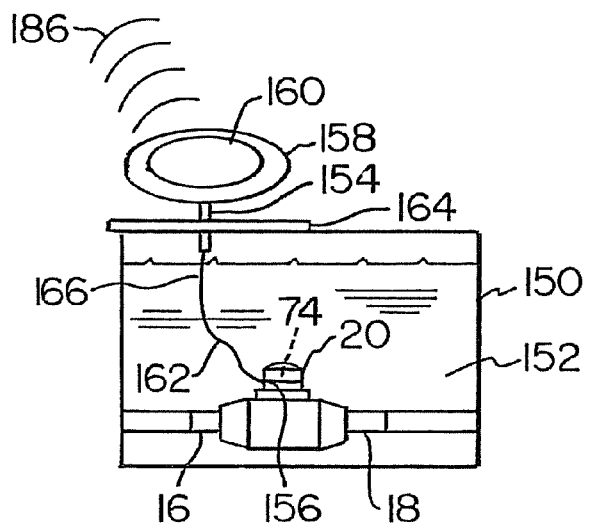
FIG. 14 shows a meter made in accordance with the present invention positioned in a pit and coupled to an auxiliary antenna.
Figure 15:
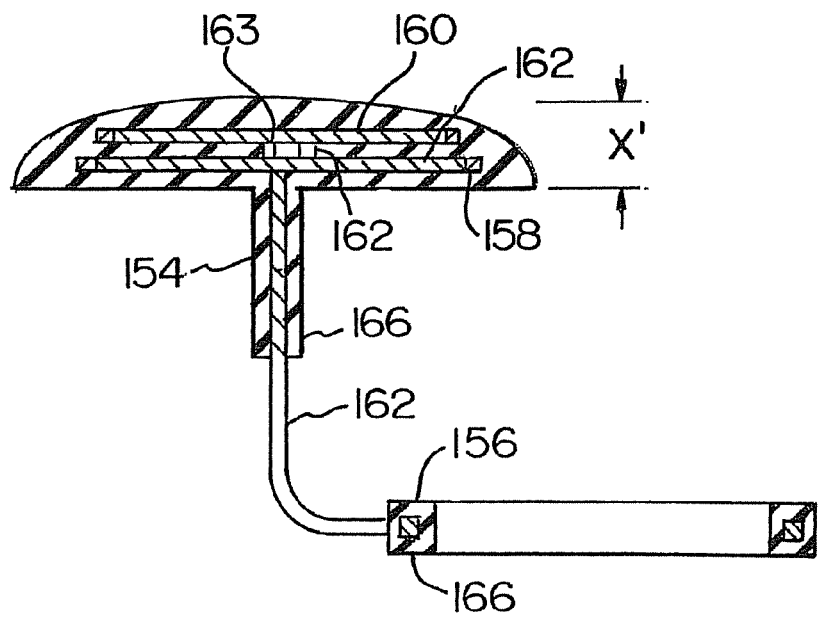
FIG. 15 is a partial sectional view of the auxiliary antenna shown in FIG. 14.
Figure 16:
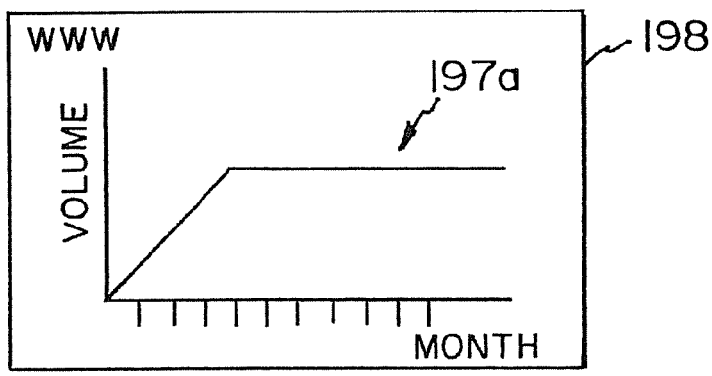
FIG. 16 is a schematic view of a computer screen showing utility consumption in some graph form.
Figure 17:
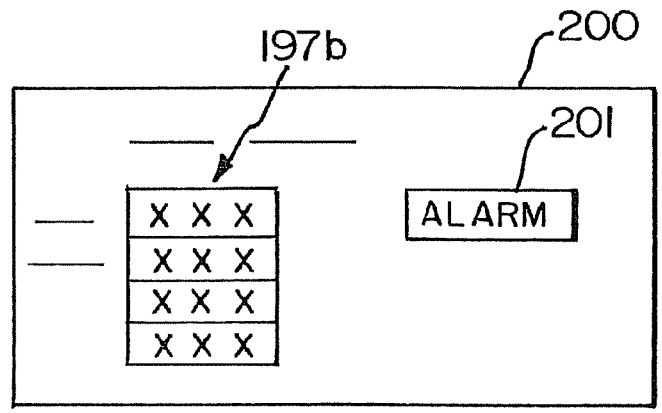
FIG. 17 is a schematic view of a computer screen showing utility consumption in numerical form.
Figure 18:
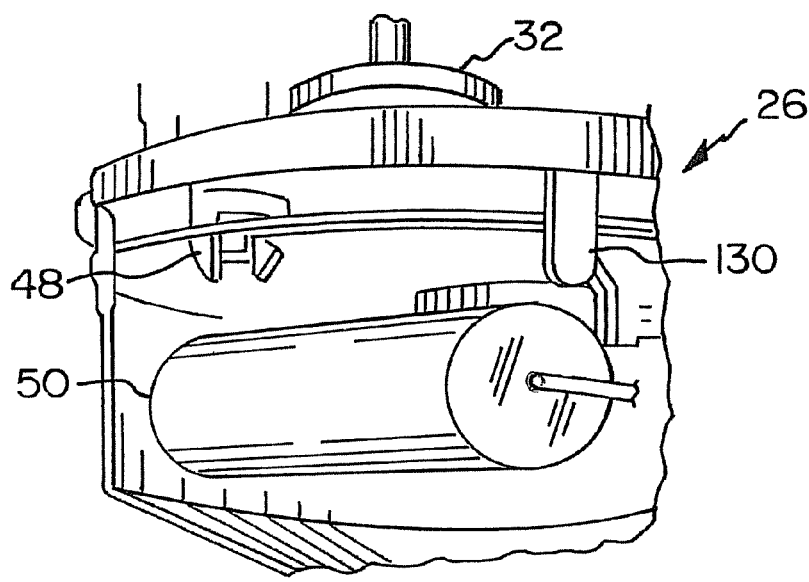
FIG. 18 is a partial perspective view of a portion of the register shown in FIG. 4 made in accordance with the present invention.
Figure 19:
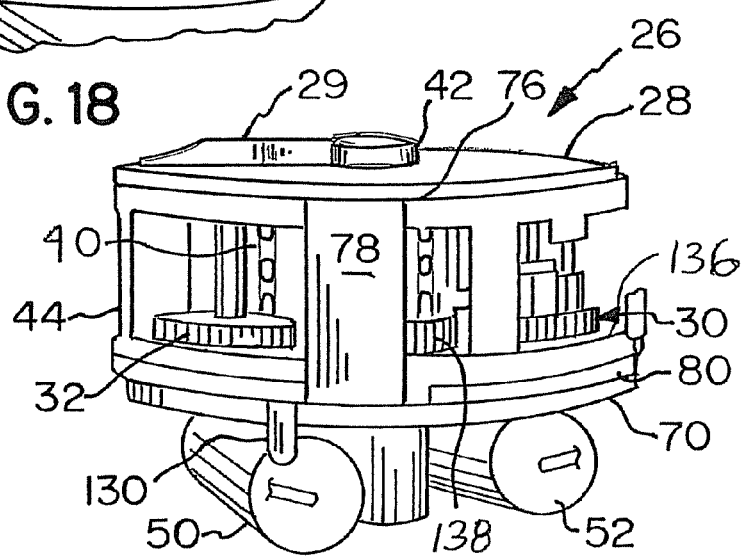
FIG. 19 is a perspective bottom view of a portion of the register shown in FIG. 4.
Figure 20:
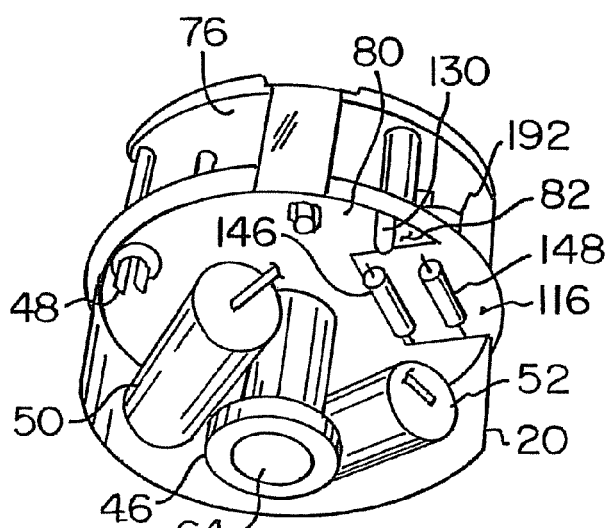
FIG. 20 is another perspective bottom view of a portion of the register shown in FIG. 4.

In various cases, the meter, particularly the water meter 10, is contained in a pit 150, as shown in FIG. 14, positioned in the ground. In this arrangement, the radio wave signals of the antenna 74 cannot radiate a great distance due to the properties of the pit 150. Further, in some instances, the pit 150 may fill with water 152 further hampering the transmission capability of the antenna 74. In such instances, an auxiliary antenna 154 is provided. As shown in FIG. 15, the auxiliary antenna 154 includes a circular metallic ring 156 that is adapted to be glued or fixedly attached to the face cap 22. A first pit electrically conductive sheet 158 and a second pit electrically conductive sheet 160 are provided. An electric insulator is provided between the two sheets 158 and 160, hence, sheets 158 and 160 are spaced apart. An electrically conductive wire or cable 162 attaches the circular metallic ring 156 to the first pit electrically conductive sheet or radiating plane 158 and the second pit electrically conductive sheet or ground plane 160 via a short circuit element 163. The first pit electrically conductive sheet 158 and the second pit electrically conductive sheet 160 are adapted to be positioned above a pit lid 164. The first pit electrically conductive sheet 158, second pit electrically conductive sheet 160, and short circuit element 163 also form a PIFA antenna. Further, the first pit electrically conductive sheet 158, second pit electrically conductive sheet 160, the circular metallic ring 156, and the cable 162 are encased in a polymeric coating or waterproof coating 166 so that should the pit 150 fill with water 152, the auxiliary antenna 154 is not affected. Preferably, the first pit electrically conductive sheet 158 and second pit electrically conductive sheet 160 are circular in shape and are made from one unitary metallic sheet, such as copper, along with the short circuit element 163, like antenna 74. The axial spacing X' of the first pit electrically conductive sheet 158 and the second pit electrically conductive sheet 160 is equal to or a multiple of the wavelength of the frequency transmitted by the antenna 74. It is important to note that no external power source, such as batteries, supply power to the auxiliary antenna 154. The radio waves transmitted from antenna 74 are received by the ring 156, pass through the cable 162, and are then transmitted via conductive sheets 158 and 160.

The approximate direction of one antenna 74 is as follows: diameter of the circular section 80 is approximately 2.5"; distance X is approximately 0.75"; and diameter of the arc-shaped section 76' is approximately 2.5" for approximately 180°. Likewise, the circular sheets 158 and 160 have a diameter of approximately 2.5" and spaced apart a distance X' of approximately 0.75". It is important to note that no separate electrical power is provided to the auxiliary antenna 154 and that an antenna signal 168 is generated external of the pit 150 via the first pit electrically conductive sheet 158 and the second pit electrically conductive sheet 160.

Figure 12:
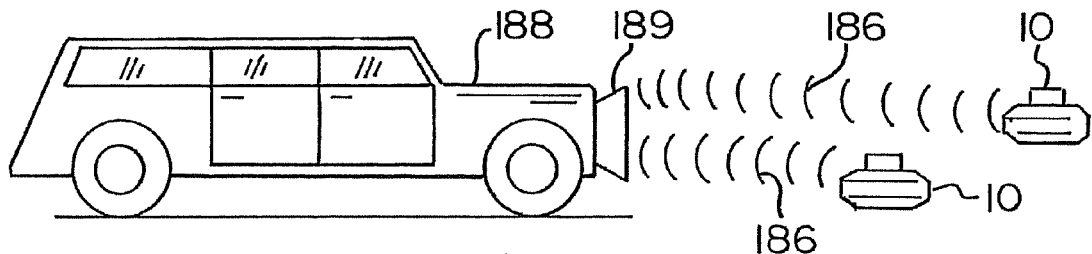
FIG. 12 is a schematic view showing a plurality of meters incorporating a meter register made in accordance with the present invention communicating with a receiver mounted on a vehicle.
Figure 13:
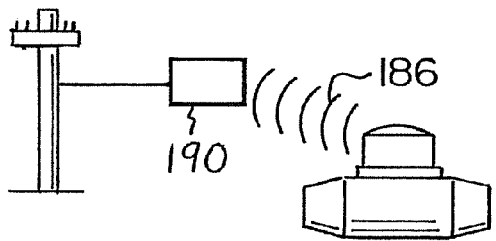
FIG. 13 is a schematic view of a meter, including a register made in accordance with the present invention, sending a signal to a receiver which then communicates via a telephone line.

The following discusses operation of the present invention. Initially, water passes through the inlet 16 causing the measuring chamber 14 to rotate. The water then flows through the outlet 18. The measuring chamber 14 causes the magnetic drive 65 attached to the measuring chamber 14 to rotate. The corresponding magnetic coupling 64 provided in the register 20 is likewise rotated causing the drive shaft 62 to rotate. This in turn causes gears 32 of the gear train drive 30 to rotate which in turn causes the odometer 40 to move indicating the quantity of liquid flowing through the meter. At the same time, the magnet arrangement 34 rotates causing the sensing magnet 142 to rotate about the reed switches 54 and 56. Depending on the sequence of the states of the reed switches 54 and 56 as shown in FIG. 9 and previously discussed, the microprocessor 72 can determine the number of rotations of the measuring chamber and the direction of rotation. In this manner, a signal can be provided to the antenna 74 indicating the number of rotations which, in turn, determines the volumetric amount of fluid passing through the meter. Also, in this manner the position of the gear wheel 32s can be approximated by the state of the reed switches. The signal designated as 186 is then transmitted through the antenna 74 and, where applicable, the auxiliary antenna 154. In other words, depending on the situation, the antenna 74 may be used without the auxiliary antenna 154. The transmitted signal 186 is then picked up by a receiver 189. The receiver 189 may, for example, be attached to a vehicle 188 as shown in FIG. 12. The vehicle 188 receives various packets or information transmitted from the antenna 74. This information then can be transmitted to a central computer which then can provide the information to the end user through various means, including the internet. Alternatively, the meters 10 can be read by a meter reader individual going through each meter, i.e., an individual may carry a receiver and walk past the meters with the information transmitted by the respective antenna 74 and/or auxiliary antenna 154 to a receiver 189. Further, the information can be provided through a stationary receiver 190 which can then either transmit another radio wave signal or send the information through telephone lines or the equivalent. Also, the signals can be received to a concentrator which then can be provided to a central source, such as through an Application Service Provider (ASP), which will convert the information into a usable format, which both the utility and the user can access via the internet, for example. In this manner, neither the utility nor the user needs special software to obtain billing and usage information since the central source (ASP) would provide this information in a user-friendly format, as will be discussed below.

Once the water begins to flow from the inlet 16 to the outlet 18, the rotating element in the measuring chamber 14, such as a multi-jet wheel, rotates which in turn causes the magnetic coupling 64 to rotate. This causes the drive shaft 62 to rotate with the respective gear train drive 30. Hence, the dial 29 and the odometer 40 are caused to move. Likewise, the cruciform of the magnetic arrangement 34 rotates. In the present case, the magnetic arrangement 34 includes a single magnet 142. The magnetic field caused by the magnet magnetically coacts with the two reed switches 54 and 56. The state of the reed switches 54 and 56 are affected by the magnetic field of the magnet 142 to determine which sequence can be used to determine the direction of flow through the meter 10 such as, for example, the sequence of reed switches 54 and 56 is as follows: 0,0; 1,0; 1,1; 0,1; 0,0, etc., then this would indicate reverse flow. More than one magnet can be provided in the cruciform magnet arrangement. In the case of three magnets or an odd number of magnets provided in the cruciform section, directional flow can be determined. However, where only two oppositely positioned magnets are provided, or four magnets are provided, in each of the cruciform segments, only an indication of movement or the register can be determined, not the direction of rotation. More particularly, both flow rate and flow direction can be determined if the magnets are arranged in a non-symmetric arrangement about the cruciform, i.e., three magnets or two magnets positioned next to each other.

Further, the signal information provided via the antenna 74 may also include an odometer meter reading corresponding to the meter odometer 40. Furthermore, the register can transmit, periodically or nonperiodically, information through the antenna 74 and identify such information as the meter coating utility consumption. Further, the antenna 74 can not only transmit information signals but, likewise, can receive information signals 194 from a transmitter 196, that is a two-way communication. Preferably, this information can be used to correctly adjust the transmitted meter information indicating the odometer reading and other information. This permits the information to be transmitted via the meter register 20 to be modified in the field without removal of the meter register 20.

The microprocessor 72 can also provide other information related to the operation of the meter. For example, the register 20 can monitor the flow rate via the reed switches 54 and 56, through the meter and, if that information exceeds a fixed flow rate number or the flow rate does not change over a period of time, an alarm can be issued indicating that there may be a leak. Specifically if, for example, the meter 10 can detect a flow rate Q as low as 1 liter or quart per hour and over a fixed period of time t, e.g., thirty minutes, and if Q/t over a fixed period of time, e.g., one hour, remains constant, then this could indicate a leak condition. A low constant flow rate over a period of time could indicate a small leak, such as in a toilet, or a large consistent flow rate over a period of time could indicate that a main water line has failed or a bathtub is overflowing. An alarm can be issued either at the location of the meter, or via e-mail or a telephone message, for example.

Preferably, the batteries 50 and 52 provide power to the electronics of the register at 10 milliwatts and power consumption is typical at 2 micro amperes. It is believed that in this arrangement the battery life can be approximately 8 years. Preferably, the antenna 74 transmits data having a 3.3-4 milliseconds length of compression data and the time between transmissions can vary, for example, 6 seconds or twice a day from the meter, depending on the particular situation. The meter 10 can also receive information, i.e., radio signals Q, from a transmitting source TS as shown in FIG. 11. More preferably, the present invention system transmits information through a series of character strings that essentially identify a base code, an I.D. code, a system code, an area code, a meter-type water consumption register, reverse flow consumption, status, and a billing factor. This information can be modified on a case-by-case basis. Preferably, the present invention transmits at radio frequencies of 10 dbm (10 mW) narrow band, 800-980 MHz frequency or any other radio frequency, for example, per FCC (United States Federal Communications Commission).

More preferably, the present invention can be utilized in connection with the vehicle 188 which can receive the meter reading signals 186 emitted from the register antenna 74. Specifically, the vehicle 188 can travel a set meter reading route. Along that route the vehicle receiving unit 189 will receive the various radio waves from respective meters 10. The vehicle 188 can be provided with computer assistance to store this information. This information, which includes consumption information, can be sent to a central computer for billing and other information. The vehicle receiving unit can identify if it does not receive the signal from the meter designated on the route. This may indicate that an antenna wire was cut and/or the register was tampered with. An alternative arrangement can be provided that the meter antenna transmits meter reading information to a communication concentrator. This information can be forwarded via a communication line, such as a modem line, or radio waves to a central computer for collation of the information. As described earlier, this information can then be sent to an ASP. This information can be analyzed for billing purposes.

Finally, the information transmitted via the antenna 74 can then be provided through a world-wide-web or internet-based system whereby the user or utility can obtain this information via typing into a computer the user's I.D. number and password at the ASP website. The present invention can also be used in the submetering market, where the submetering entity is responsible for collecting utility fees from users. Such information that may be obtained is meter usage 197a and billing information 197b via screens 198 and 200 such as shown in FIGS. 14 and 15. This information would be presented in real time. Therefore, if one wishes to monitor utility consumption, he or she need only to log onto this website from anywhere throughout the world where internet access is available. Further, utilities and users need not use special software packages to obtain the information since it would be provided by the web-based ASP that provides respective reports. Further, if it is believed that there is a leak occurring or tampering of the meter, an e-mail message 201 or automated message can be sent to the household or business for an emergency telephone number for further evaluation. For example, if a leak is detected in a home, the home owner could be e-mailed or telephoned at an emergency number to check whether a leak is occurring. Furthermore, a physical alarm can be provided on the meter, in which case, an alarm can be emitted from that meter. Also, an opening and closing valve can be provided on the pipe p, which can be remotely activated to an opened and/or closed position depending on the volume of water passing through the meter. As can be seen, the present invention solves many problems that are in existence in automatic meter reading technology. Further, the present invention can be used to measure any type of fluid, including water, gas, gasoline, etc., as well as any other type of metered materials.

Having described the presently preferred embodiments of this invention, it is to be understood that it may otherwise be embodied within the scope of the appended claims.

The invention claimed is:

1. A method of detecting a leak in a liquid consumption system, comprising the following steps:

providing a meter housing having a liquid inlet opening, a liquid outlet opening, a measuring chamber between, and in fluid communication with, the liquid inlet and the liquid outlet openings, and a cavity having an access opening;

providing a sealed meter register in the access opening of the meter housing, wherein the meter register comprises a microprocessor and the meter register is magnetically coupled with the measuring chamber to coact with the measuring chamber to receive liquid flow information from the measuring chamber, wherein the microprocessor of the meter register receives the liquid flow information and measures the amount of liquid flowing through the measuring chamber as a function of time defined as a measured flow rate;

passing a liquid from a liquid source, through the liquid inlet opening of the meter, through the measuring chamber of the meter and through the liquid outlet opening of the meter to the liquid consumption system, wherein as the liquid moves though the measuring chamber, the measuring chamber generates the liquid flow information, and the microprocessor provides the measured flow rate; and generating a signal indicating a leak when the measured flow rate is greater than zero and when one of the following events occurs:
(i) the measured flow rate remains constant over a fixed period of time, or
(ii) the measured flow rate exceeds a threshold flow rate value.

2. The method as claimed in claim 1, further comprising the steps of transmitting information when said meter has been tampered with.

3. The method as claimed in claim 1, further comprising transmitting information when said meter has been tampered with, wherein said tampering comprises subjecting said meter register to a magnetic field above a threshold value.

4. The method as claimed in claim 1, wherein said meter is adapted to receive signals from an external source.

5. The method as claimed in claim 1, further comprising the step of providing shut-off means in a liquid line which is coupled to said meter and opening and closing said shut-off means depending on the volume of liquid passing through said meter.

6. The method as claimed in claim 1, wherein the transmitted signal is an identification signal.

7. The method as claimed in claim 1, wherein the liquid is water.

8. The method as claimed in claim 1, wherein the meter register and meter are part of an automated meter reading system.

9. The method as claimed in claim 1, wherein the signal is transmitted to indicate a leak when the measured flow rate is greater than zero and the measured flow rate remains constant over a fixed period of time.

10. The method as claimed in claim 1, wherein the signal is transmitted to indicate a leak when the measured flow rate is greater than zero and the measured flow rate exceeds a threshold value.

11. A method of detecting a leak in a fluid consumption system, comprising the following steps:
providing a fluid meter to pass a fluid from a fluid source, through the meter to the fluid consumption system;
providing a meter register to coact with the meter to measure the amount of fluid flowing through the meter from the fluid source to the fluid consumption system;
providing a microprocessor to receive fluid flow information from the meter register to measure the amount of fluid moving through the meter from the fluid source to the fluid consumption system as a function of time defined as a measured flow rate;
generating a transmitted signal indicating a leak when the measured flow rate is greater than zero and when one of the following events occurs:
(i) the measured flow rate remains constant a fixed volume over a fixed period of time, or
(ii) the measured flow rate exceeds a threshold flow rate value, and
said method further comprises the step of determining reverse flow through said meter and transmitting such information.

12. A method of detecting a leak in a liquid consumption system, comprising the following steps:
providing a meter having a measuring chamber, wherein a liquid passes from a liquid source, through the measuring chamber of the meter to the liquid consumption system;
providing a meter register having a microprocessor, wherein the meter register is magnetically coupled with the measuring chamber to coact with the meter to measure the amount of liquid flowing from the liquid source through the meter to the liquid consumption system, and wherein the microprocessor receives liquid flow information from the meter register to measure the amount of liquid from the liquid source moving through the meter to the liquid consumption system as a function of time defined as a measured flow rate; and
generating a signal indicating a leak when the measured flow rate is greater than zero and when one of the following events occurs:
(i) the measured flow rate remains constant over a fixed period of time, or
(ii) the measured flow rate exceeds a threshold flow rate value,
wherein said signal includes information corresponding to an odometer reading on said meter.

13. A method of detecting a leak in a liquid consumption system, comprising the following steps:
providing a meter adapted to receive signals from an external source, the meter having a measuring chamber, wherein a liquid passes from a liquid source, through the measuring chamber of the meter to the liquid consumption system;
providing a meter register having a microprocessor, wherein the meter register is magnetically coupled with the measuring chamber to coact with the meter to measure the amount of liquid flowing from the liquid source through the meter to the liquid consumption system, and wherein the microprocessor receives liquid flow information from the meter register to measure the amount of liquid from the liquid source moving through the meter to the liquid consumption system as a function of time defined as a measured flow rate; and
generating a signal indicating a leak when the measured flow rate is greater than zero and when one of the following events occurs:
(i) the measured flow rate remains constant over a fixed period of time, or
(ii) the measured flow rate exceeds a threshold flow rate value, and
transmitting to the meter a first signal from the external source to adjust a transmitting second signal from the meter, the second signal indicating an odometer reading.

* * * * *

UNITED STATES PATENT AND TRADEMARK OFFICE
CERTIFICATE OF CORRECTION

| | | |
|---|---|---|
| PATENT NO. | : 8,109,131 B2 | |
| APPLICATION NO. | : 12/013853 | |
| DATED | : February 7, 2012 | |
| INVENTOR(S) | : Dan Winter | |

It is certified that error appears in the above-identified patent and that said Letters Patent is hereby corrected as shown below:

Column 11, Line 5, Claim 1, delete "though" and insert -- through --

Column 11, Line 19, Claim 3, after "claim 1" insert -- , --

Signed and Sealed this
Seventeenth Day of April, 2012

David J. Kappos
*Director of the United States Patent and Trademark Office*

UNITED STATES PATENT AND TRADEMARK OFFICE
CERTIFICATE OF CORRECTION

PATENT NO.        : 8,109,131 B2                           Page 1 of 1
APPLICATION NO.   : 12/013853
DATED             : February 7, 2012
INVENTOR(S)       : Dan Winter It is certified that error appears in the above-identified patent and that said Letters Patent is hereby corrected as shown below:

Column 6, Line 60, after "segment" delete "by" and insert -- $\beta\gamma$ --

Signed and Sealed this
Thirtieth Day of October, 2012

David J. Kappos
*Director of the United States Patent and Trademark Office*